United States Patent
Kojima et al.

(10) Patent No.: US 7,554,226 B2
(45) Date of Patent: Jun. 30, 2009

(54) AXIAL AIR GAP TYPE ELECTRIC MOTOR

(75) Inventors: Tomonori Kojima, Kanagawa (JP);
Atsushi Itagaki, Kanagawa (JP);
Masanori Murakami, Kanagawa (JP);
Yoichi Tanabe, Kanagawa (JP);
Toshiaki Tanno, Kanagawa (JP);
Hirokazu Matsuzaki, Kanagawa (JP);
Masaki Yamada, Kanagawa (JP)

(73) Assignee: Fujitsu General Limited, Kanagawa (JP)

( * ) Notice: Subject to any disclaimer, the term of this patent is extended or adjusted under 35 U.S.C. 154(b) by 0 days.

(21) Appl. No.: 11/445,209

(22) Filed: Jun. 2, 2006

(65) Prior Publication Data

US 2006/0279150 A1 Dec. 14, 2006

(30) Foreign Application Priority Data

Jun. 3, 2005 (JP) .............................. 2005-163940

(51) Int. Cl.
*H02K 5/24* (2006.01)
*H02K 21/12* (2006.01)

(52) U.S. Cl. ..................... 310/51; 310/91; 310/156.36; 310/156.37; 310/268

(58) Field of Classification Search .................. 310/51, 310/91, 268, 156.36, 156.37
See application file for complete search history.

(56) References Cited

U.S. PATENT DOCUMENTS 3,253,170 A * 5/1966 Phillips et al. ............... 310/168
3,568,962 A * 3/1971 Janssen ....................... 384/536
5,945,766 A 8/1999 Kim et al.
6,208,055 B1 * 3/2001 Takahashi ............... 310/156.01
6,486,580 B1 * 11/2002 Cenzer et al. .................. 310/90

FOREIGN PATENT DOCUMENTS

| DE | 298 24 616 U1 | 11/2001 |
| JP | 02 223346 A | 9/1990 |
| JP | 2000 069711 A | 3/2000 |
| JP | 2003-161328 | 6/2003 |
| JP | 2004-282989 | 10/2004 |
| JP | 2004 282989 A | 10/2004 |

* cited by examiner

*Primary Examiner*—Quyen P Leung
*Assistant Examiner*—Alex W Mok
(74) *Attorney, Agent, or Firm*—Venable LLP; Michael A. Sartori; Steven J. Schwarz (57) ABSTRACT

A magnetic pre-pressurizing section for pre-pressurizing the inner ring of the bearing in the axial direction by a difference of magnetic forces of permanent magnets of the two rotors is arranged. The magnetic pre-pressurizing section is constructed by a difference of a magnetizing amount for forming permanent magnets 8b, 9b arranged in the respective rotors. The magnetic pre-pressurizing section is also constructed by a difference of distances of an air gap L1 of a stator 2 and a permanent magnet 8b1, and an air gap L2 of the stator 2 and a permanent magnet 9b1. The magnetic pre-pressurizing section is also constructed by a difference of thicknesses of the rotating axis direction of a permanent magnet 8b1 and a permanent magnet 9b2 arranged in the respective rotors.

18 Claims, 11 Drawing Sheets

IN FIGS. 7A TO 7D, ARROWS SHOW SHIFT DIRECTIONS
FROM THE CENTRAL POSITION

AXIAL AIR GAP TYPE ELECTRIC MOTOR

BACKGROUND OF THE INVENTION

The present invention relates to a bearing of an axial air gap type electric motor, and more particularly, relates to a preventing structure of a vibration and noises of the bearing using a radial ball bearing.

A structure for removing a play space of an inner ring and an outer ring of the ball bearing has been used as a structure for preventing a vibration and noises of the bearing using the ball bearing in the related art. Namely, this structure is a structure for arranging a pre-pressurizing means for pre-pressurizing the outer ring side to intentionally shift the inner ring and the outer ring of the ball bearing in the direction of a rotating axis.

For example, this structure will be explained by using the radial gap type electric motor shown in FIG. 13.

Figure 13:
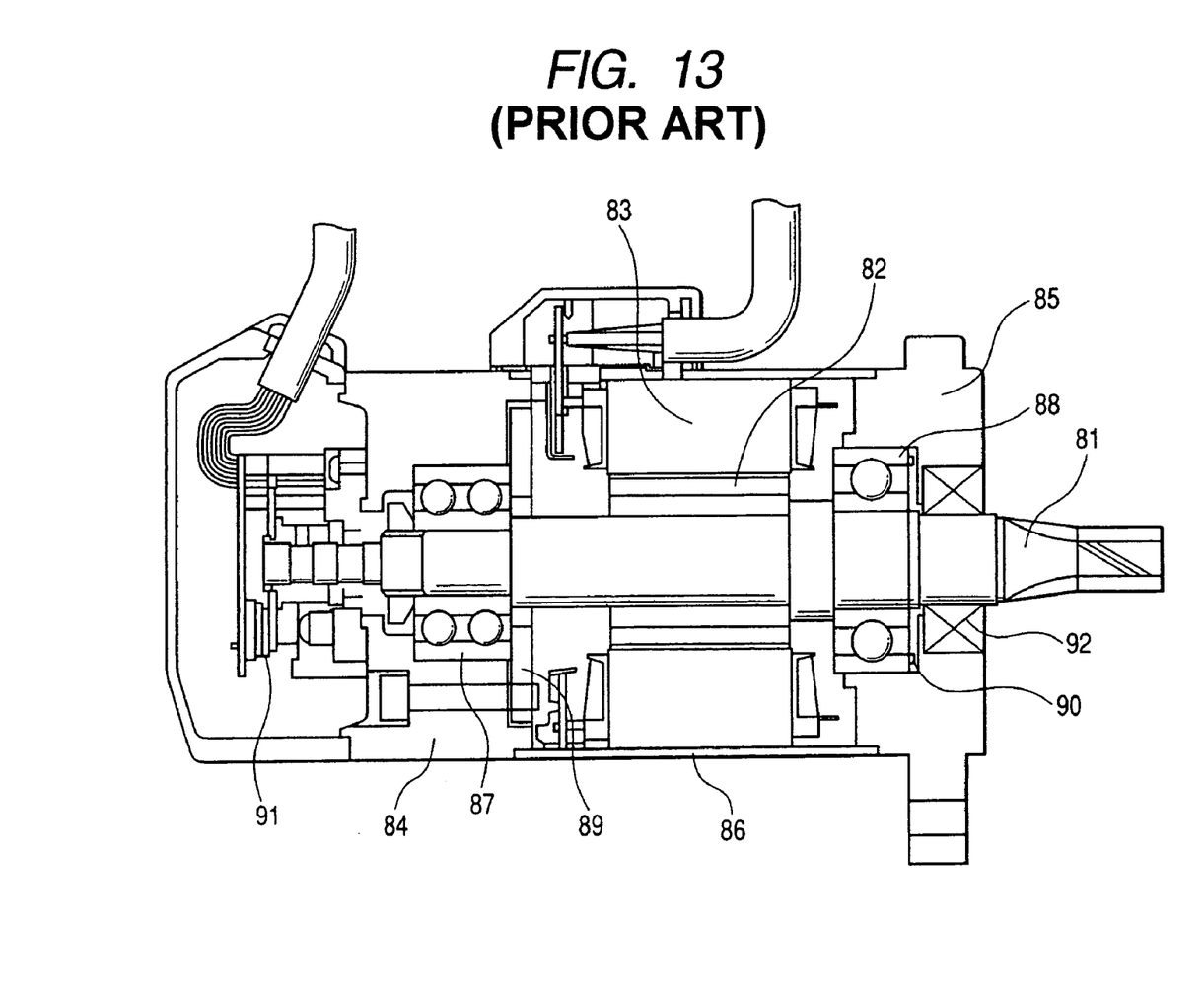
FIG. 13 is a cross-sectional view showing a conventional radial gap type electric motor.

In the sectional view of FIG. 13, reference numerals 81, 82 and 83 respectively designate a rotating shaft of a motor, a rotor and a stator wound by a wire. Reference numerals 84, 85 and 86 respectively designate a bracket of a side opposed to load, a bracket of the load side, and a frame. Reference numerals 87, 88 and 89 respectively designate a double row angular ball bearing, a ball bearing and a pressing plate. Reference numerals 90, 91 and 92 respectively designate a waveform spring (pre-pressurizing section) of an elastic body, an optical type encoder of a separating type, and an oil seal.

The radial gap type electric motor will next be explained with an assembly method as a center. In the rotor 82, magnets of an outer circumference are alternately magnetized to the N-poles and the S-poles in advance, and are press-fitted and fixed to the rotating shaft 81. The stator 83 is shrink-fitted and fixed to the frame 86.

Next, inner rings of the double row angular ball bearing 87 and the ball bearing 88 are press-fitted and fixed to predetermined positions of the rotating shaft 81. An outer ring of the double row angular ball bearing 87 is stored to a housing portion of the bracket 84, and is screwed and fixed to the bracket 84 so as to be nipped by the housing portion and the pressing plate 89. The bracket 84 of this state is fixed to an opening end portion of the side opposed to the load in the frame 86. Further, the opening end portion of the opposite (load) side of the frame 86 and the bracket 85 are fitted such that the outer ring of the ball bearing 88 and the waveform spring 90 are abutted within the housing of the bracket 85.

When the bracket 85 and the frame 86 are fixed, the outer ring of the ball bearing 88 is coated with an adhesive, and the waveform spring 90 is compressed by a size corresponding to an appropriate given pressure in an axial direction, and is fixed. Namely, in this motor, all the inner and outer rings of the double row angular ball bearing 87 and the ball bearing 88 are fixed in a state in which the appropriate given pressure is applied (e.g., see patent literature 1).

Further, an example for applying the bearing structure having such a pre-pressurizing section to the axial air gap type electric motor will be explained.

Figure 11:
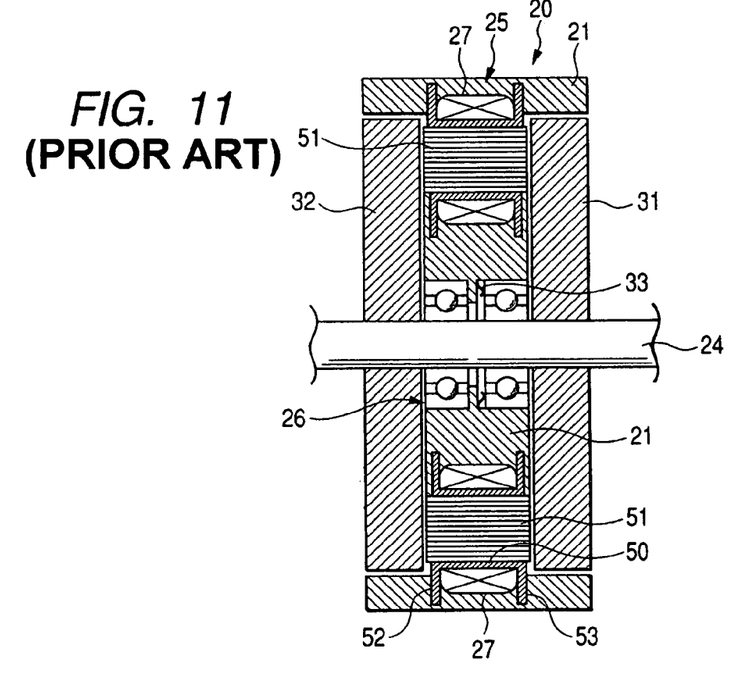
FIG. 11 is a cross-sectional view showing a conventional axial air gap type electric motor.
Figure 12:
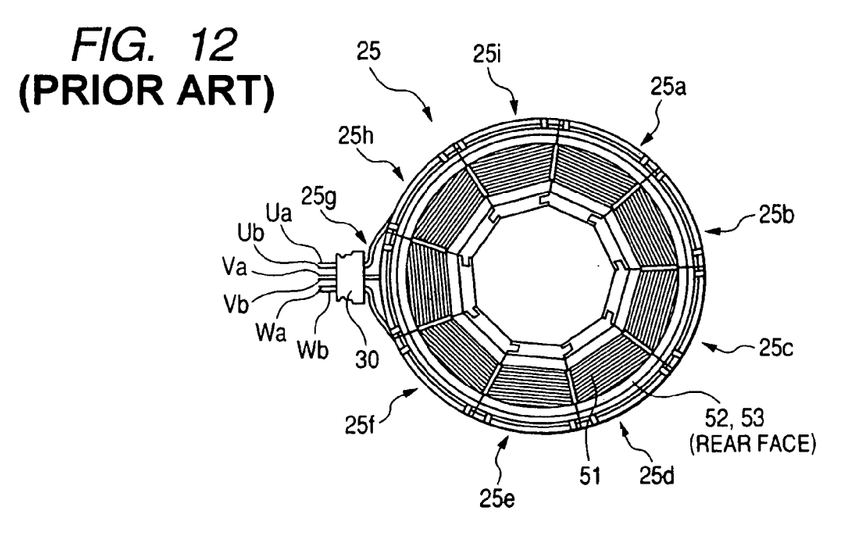
FIG. 12 is a plan view showing a stator of the conventional axial air gap type electric motor.

As shown in the cross-sectional view of the electric motor of FIG. 11 and the plan view of a stator core of FIG. 12, the axial air gap type electric motor of three phases and nine slots includes a stator 20 approximately formed in a disk shape, and rotors 31, 32 constructed by a pair of plastic magnets oppositely arranged with a predetermined air gap on both sides of the stator 20. The rotors 31, 32 commonly have the same rotating shaft 24. The stator 20 has a bearing portion 26 for supporting the rotating shaft 24 on its inner circumferential side.

In reality, the stator 20 and the rotors 31, 32 are stored into an unillustrated bracket (box body), and an outer circumferential side of the stator 20 is fixed to a bracket.

The stator 20 has a stator core 25 formed in a ring shape (a so-called donut shape), and a bearing portion 26. coaxially inserted on an inner circumferential side of the stator core 25. The stator core 25 is integrally molded by synthetic resin 21. In this example, each bearing 26 has one radial ball bearing.

As shown in FIG. 12, the stator core 25 is constructed by connecting nine ball members 25a to 25i in a ring shape. All the respective ball members 25a to 25i have the same shape.

Further, as shown in FIG. 11, one ball member 25d has a tease (iron core) 51 formed by laminating plural metallic plates in a trapezoidal shape. An insulator 50 constructed by synthetic resin is integrally formed around the tease 51 except for its both side faces.

The insulator 50 is entirely formed in a bobbin shape of an H-shape in section including flanges 52, 53 of an approximately fan shape arranged as a pair of left and right along both the side faces of the tease 51. A coil 27 is structurally wound between these flanges 52, 53.

After a ball member unit of three phases is formed, as shown in FIG. 12, a ball member for a U-phase is sequentially arranged in an arc shape. In this case, a ball member for a V-phase adjacent to the ball member for the U-phase and a ball member for a W-phase adjacent to the ball member for the V-phase are respectively arranged in an arc shape. Both neighbors of these respective ball members are connected to each other. Thus, the nine ball members are assembled in a ring shape.

Ua, Ub are leader lines for the U-phase, and Va, Vb are leader lines for the V-phase, and Wa, Wb are leader lines for the W-phase. Each leader line is connected to a driving circuit substrate for an unillustrated electric motor through a holding body 30 of a resin property for holding to the stator core 25.

An outer circumferential portion and an inner circumferential portion of each ball member, and the holding body 30 for the leader line are solidified by synthetic resin 21 by insert molding. Thereafter, the rotating shaft 24 fixing the bearing portion 26 thereto in one predetermined position is inserted from one face of the stator core 25 into its center. Further, this bearing portion 26 is press-fitted into the stator core 25.

Next, a leaf spring of a ring shape of a waveform in section (wave washer spring) 33 is arranged between the inner circumferential side of the other face of the stator core 25 and the bearing portion 26. Next, another bearing portion 26 is inserted from the other direction of the rotating shaft 24, and is fixed in a predetermined position of the rotating shaft 24 (e.g., see patent literature 2).

However, in the above two conventional examples, the radial ball bearing is used in the bearing. Therefore, a space of play exists in these inner and outer rings, and resonance is generated by a sliding period of a rotating axis direction generated by attraction and repulsion of the rotor due to magnetic force, and the value of a repulsion constant of the leaf spring for pre-pressurizing the outer ring. Thus, there is a case in which large vibration and noises are generated. The principle of this resonance will be explained in detail in embodiments.

[Patent literature 1] JP-A-2003-161328 (pages 3 to 4 and FIG. 1)

[Patent literature 2] JP-A-2004-282989 (pages 9 to 12 and FIG. 1).

SUMMARY OF THE INVENTION

The present invention solves the above problems, and its object is to provide a structure having a section for pre-pressurizing the rotating shaft in the rotating axis direction in an axial air gap type electric motor for fixing two rotors to the rotating shaft and having two rolling bearings in this rotating shaft.

To solve the above problems, according to the present invention, there is provided an axial air gap type electric motor including: a stator having tease portions on both side faces; a rotor having permanent magnets respectively oppositely arranged with predetermined air gaps in the tease portions; a rotating shaft arranged on a rotating axis of the rotor and fixing the two rotors thereto; two ball bearings having an inner ring fixed to the rotating shaft by pivoting the rotating shaft, and an outer ring fixed to the stator; and magnetic pre-pressurizing section for pre-pressurizing the inner ring in an axial direction by a difference of magnetic force of the axial direction in one of the air gaps and the other of the air gaps.

Further, there is provided an axial air gap type electric motor including: a stator having tease portions on both side faces; a rotor having permanent magnets respectively oppositely arranged with predetermined air gaps in the tease portions; a rotating shaft arranged on a rotating axis of the rotor and fixing the two rotors thereto; two ball bearings having an inner ring fixed to the rotating shaft by pivoting the rotating shaft; and two brackets forming mounting portions respectively mounting the ball bearings thereto, and fixing an outer ring of the ball bearing to the mounting portion; magnetic pre-pressurizing section for pre-pressurizing the inner ring in an axial direction by a difference of magnetic force of the axial direction in one of the air gaps and the other of the air gaps.

Further, there is provided an axial air gap type electric motor including: a stator having tease portions on both side faces; a rotor having permanent magnets respectively oppositely arranged with predetermined air gaps in the tease portions; a rotating shaft arranged on a rotating axis of the rotor and fixing the two rotors thereto; and two ball bearings having an inner ring fixed to the rotating shaft by pivoting the rotating shaft; an outer ring of the one ball bearing fixed to the stator; pre-pressurizing section for pre-pressurizing an outer ring of the other ball bearing in an axial direction; and magnetic pre-pressurizing section for pre-pressurizing the inner ring in the axial direction by a difference of magnetic force of the axial direction in one of the air gaps and the other of the air gaps.

Further, there is provided an axial air gap type electric motor including: a stator having tease portions on both side faces; a rotor having permanent magnets respectively oppositely arranged with predetermined air gaps in the tease portions; a rotating shaft arranged on a rotating axis of the rotor and fixing the two rotors thereto; two ball bearings having an inner ring fixed to the rotating shaft by pivoting the rotating shaft; and two brackets forming mounting portions respectively mounting the ball bearings thereto; an outer ring of the one ball bearing fixed to the mounting portion; pre-pressurizing section for pre-pressurizing an outer ring of the other ball bearing in an axial direction; and magnetic pre-pressurizing section for pre-pressurizing the inner ring in the axial direction by a difference of magnetic force of the axial direction in one of the air gaps and the other of the air gaps.

Further, preferably, the magnetic pre-pressurizing section is constructed by a difference of a magnetizing amount of the permanent magnet arranged in each of the rotors.

Further, preferably, the magnetic pre-pressurizing section is constructed by a difference of a distance of the one air gap and a distance of the other air gap.

Further, preferably, the magnetic pre-pressurizing section is constructed by a difference of volume of the permanent magnet arranged in each of the rotors.

Further, preferably, the magnetic pre-pressurizing section is constructed by a difference of magnetic force due to a difference of a material of the permanent magnet arranged in each of the rotors.

Further, preferably, the magnetic pre-pressurizing section is constructed by a difference of an opposite area of the tease portion opposed to the one air gap, and an opposite area of the tease portion opposed to the other air gap.

Further, preferably, the magnetic pre-pressurizing section is constructed by a difference of magnetic permeability in the one air gap and magnetic permeability in the other air gap.

Further, preferably, the magnetic pre-pressurizing section is constructed by a difference of an average distance of the one air gap and an average distance of the other air gap.

In accordance with the axial air gap type electric motor in the present invention using the above sections, magnetic pre-pressurizing section for pre-pressurizing the inner ring in an axial direction by a difference of magnetic force of the axial direction in one of the air gaps and the other of the air gaps is arranged in the inventions relating to aspects 1 and 2. Since no inner ring is pre-pressurized by a mechanical mechanism, the rotating shaft, i.e., the inner ring of the radial ball bearing fixed to this rotating shaft can be pre-pressurized in the rotating axis direction without arranging an additional part. Thus, a vibration and noises can be reduced.

The inventions relating to aspects 3 and 4 are constructed such that an outer ring of the one ball bearing is fixed to the stator; and the axial air gap type electric motor further includes pre-pressurizing section for pre-pressurizing an outer ring of the other ball bearing slid in an axial direction in the axial direction; and magnetic pre-pressurizing section for pre-pressurizing the inner ring in the axial direction by a difference of magnetic force of the axial direction in one of the air gaps and the other of the air gaps. Thus, even when dispersion of the axial distance of two ball bearings in a manufacturing process of the electric motor is generated, the dispersion of this distance can be easily corrected by the pre-pressurizing section, and the effects of aspects 1 and 2 can be reliably obtained.

In the invention relating to aspect 5, the magnetic pre-pressurizing section is constructed by a difference of a magnetizing amount for forming the permanent magnet arranged in each of the rotors. The sizes of a structure and members of the electric motor are set to the same as the conventional case, and only the magnetizing amount of each permanent magnet is differently set. Accordingly, even in a device kind already started in mass production, it is possible to cope with situations by only partially changing the manufacturing process.

In the invention relating to aspect 6, the magnetic pre-pressurizing section is constructed by a difference of a distance of the one air gap and a distance of the other air gap. The members and size of the electric motor are set to the same as the conventional case, and only a jig for determining a fixing position of the rotor is changed. Accordingly, even in the device kind already started in mass production, it is possible to cope with situations without changing the manufacturing process.

In the invention relating to aspect 7, the magnetic pre-pressurizing section is constructed by a difference of volume of the permanent magnet arranged in each of the rotors. Thus, the permanent magnet itself is set to a different member.

Accordingly, dispersion of pre-pressurization due to working dispersion in the manufacturing process can be prevented.

In the invention relating to aspect 8, the magnetic pre-pressurizing section is constructed by a difference of magnetic force due to a difference of a material of the permanent magnet arranged in each of the rotors. Thus, the permanent magnet itself is set to a different member. Accordingly, dispersion of pre-pressurization due to working dispersion in the manufacturing process can be prevented.

In the invention relating to aspect 9, the magnetic pre-pressurizing section is constructed by a difference of an opposite area of the tease portion opposed to the one air gap, and an opposite area of the tease portion opposed to the other air gap. Thus, it is sufficient to change only an iron core of the stator without changing the structure of the rotor and the permanent magnet. Therefore, a design period of the electric motor can be shortened.

In the invention relating to aspect 10, the magnetic pre-pressurizing section is constructed by a difference of magnetic permeability in the one air gap and magnetic permeability in the other air gap. Thus, for example, the pre-pressurization can be easily adjusted in the manufacturing process by sticking a magnetic sheet having a magnetic permeability different from that of the air gap onto a tease face and a permanent magnet face. Therefore, electric motors of many kinds different in pre-pressurization can be easily manufactured.

In the invention relating to aspect 11, the magnetic pre-pressurizing section is constructed by a difference of an average distance of the one air gap and an average distance of the other air gap. Thus, it is sufficient to change only the permanent magnet or the tease without changing the rotating shaft and the rotor, and the structure of the permanent magnet or the tease. Accordingly, the design period of the electric motor can be shortened.

BRIEF DESCRIPTION OF THE DRAWINGS

FIG. 6 is views for explaining the structure of a stopper, wherein

FIG. 7 is explanatory views of the section of a main portion of the axial air gap type electric motor in the present invention, wherein

FIG. 8 is explanatory views for explaining the sectional structure of a main portion of the stator and a rotor, wherein

FIG. 9 is explanatory views for explaining the sectional structure of a main portion of the stator, the rotor and an iron core, wherein

DETAILED DESCRIPTION OF THE PREFERRED EMBODIMENTS

An embodiment mode of the present invention will next be explained in detail as an embodiment based on the accompanying drawings. The same parts as FIGS. 11 to 12 explained in the background art are designated by the same numbers, and their detailed explanations are omitted.

The present invention is characterized in that, in an axial air gap type electric motor having a rotor opposed through a stator and also having a ball bearing, the balance of magnetic forces of two rotors is destroyed to pre-pressurize an inner ring of the ball bearing in a rotating axis direction. A structure for this will next be explained.

Embodiment 1

Figure 1:
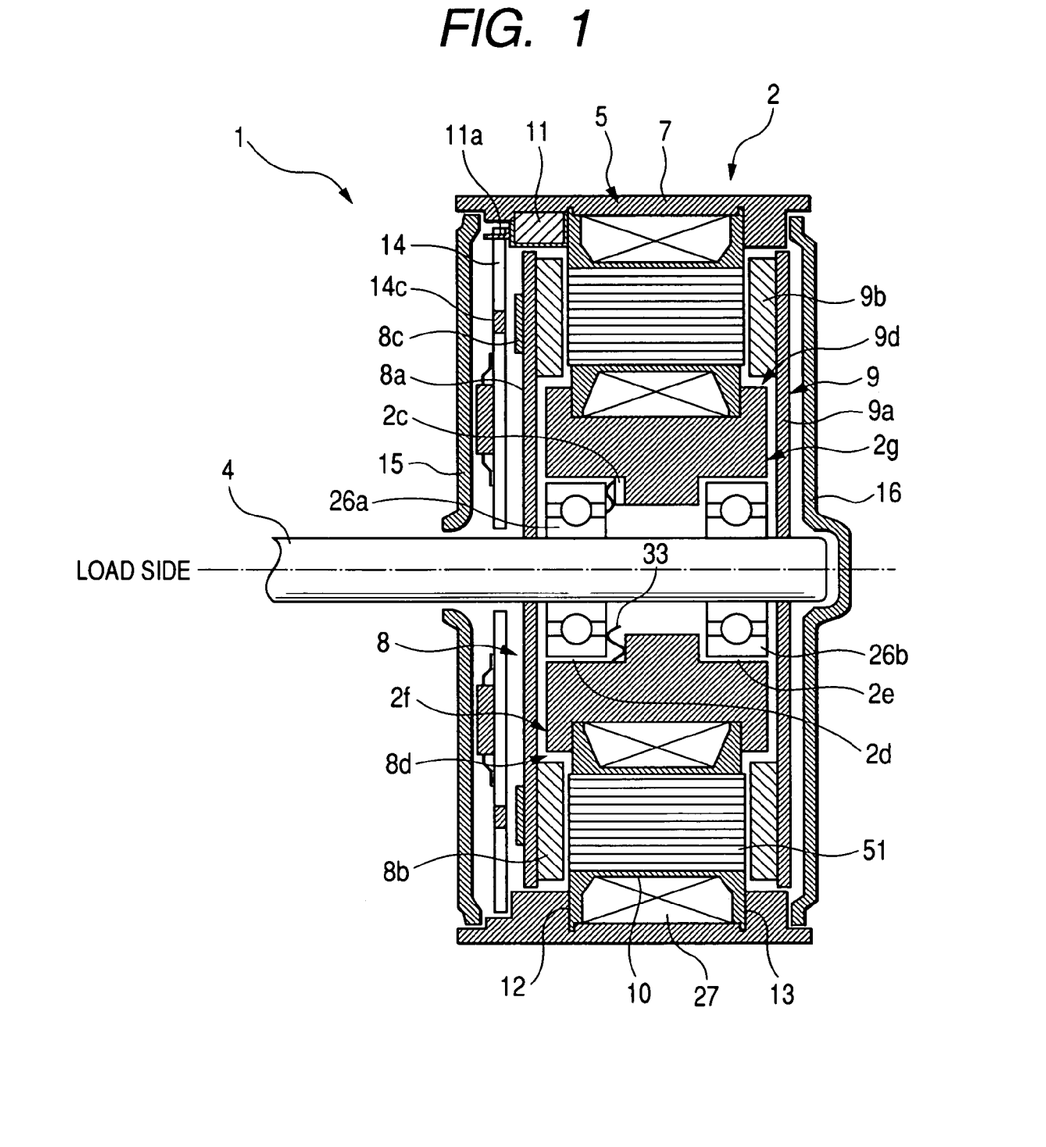
FIG. 1 is a cross-sectional view showing an embodiment of an axial air gap type electric motor in the present invention.

As shown in FIG. 1, the axial air gap type electric motor 1 of three phases and nine slots in the present invention includes a stator 2 approximately formed in a disk shape, and a pair of rotors 8, 9 oppositely arranged with a predetermined air gap on both sides of the stator 2. The rotors 8, 9 commonly have the same rotating shaft 4. The stator 2 has a first bearing 26a and a second bearing 26b coaxially inserted on its inner circumferential side, and constructed by a radial ball bearing for supporting the rotating shaft 4.

A bracket cover 15, a print substrate 14 mounting a driving circuit of the motor, the rotor 8, the stator 2, the rotor 9 and a bracket cover 16 are respectively sequentially arranged in a circular shape with the rotating shaft 4 as a center in this electric motor.

A Hall element 14c is arranged in the print substrate 14 opposed to a permanent magnet 8c for detecting the position of the rotor 8, and detects the rotating position of the rotor 8. Further, a winding connecting terminal 11a of a wire connecting body 11 is soldered to the vicinity of the outer circumference of the print substrate 14. A leader line of a coil 27 of the stator 2 is structurally connected to the print substrate 14 through the wire connecting body 11.

Further, the bracket covers 15, 16 are formed by pressing a steel plate, and are set to a structure respectively fitted and attached to both sides of the stator 2. It should be determined by a specification of the electric motor whether the bracket covers 15, 16 are mounted or not.

On the other hand, a stator core 5 formed by arranging nine ball members winding a coil 27 around an insulator 10 arranged in a tease 51 in an annular shape (a so-called donut shape) is integrally molded by synthetic resin 7 so that the stator 2 is formed. In this case, the stator 2 is integrally molded and formed by the synthetic resin 7 such that a bearing hole 2d and a bearing hole 2e for holding the first bearing 26a and the second bearing 26b are concentric with respect to the rotating shaft 4.

A projecting portion 2f for projecting the bearing hole 2d and the first bearing 26a arranged within the bearing hole 2d toward the rotor 8 is integrally molded and formed by the synthetic resin 7 on one side face of the stator 2. A projecting portion 2g for projecting the bearing hole 2e and the second bearing 26b arranged within the bearing hole 2e toward the rotor 9 is integrally molded and formed by the synthetic resin 7 on the other side face of the stator 2. These projecting portions hold the outer circumferences of the bearing holes and reliably hold the respective radial ball bearings in the stator, and can precisely align the axes of the two radial ball bearings.

The rotor 8 has a permanent magnet 8b of a fan type in a ring shape on one face opposed to a stator core 5 of a back yoke 8a constructed by a circular steel plate, and also has a permanent magnet 8c for position detection on the other face. Further, the rotor 9 has a permanent magnet 9b of a fan type in a ring shape on one face opposed to the stator core 5 of a back yoke 9a constructed by a steel plate. As this result, a concave portion 8d and a concave portion 9d as columnar spaces of the same thicknesses as these permanent magnets are respectively formed near the inner circumferences of the permanent magnet 8b and the permanent magnet 9b. The projecting portions 2f, 2g are structurally arranged in the spaces of these concave portions.

Thus, the space is arranged near the inner circumference of the permanent magnet of the rotor comparatively small in an influence on performance of the electric motor, and one portion of the stator including the radial ball bearing is arranged in this space. Thus, the thickness of the entire electric motor in its rotating axis direction can be reduced so that the electric motor can be made compact.

The stator core will next be explained.

Figure 2:
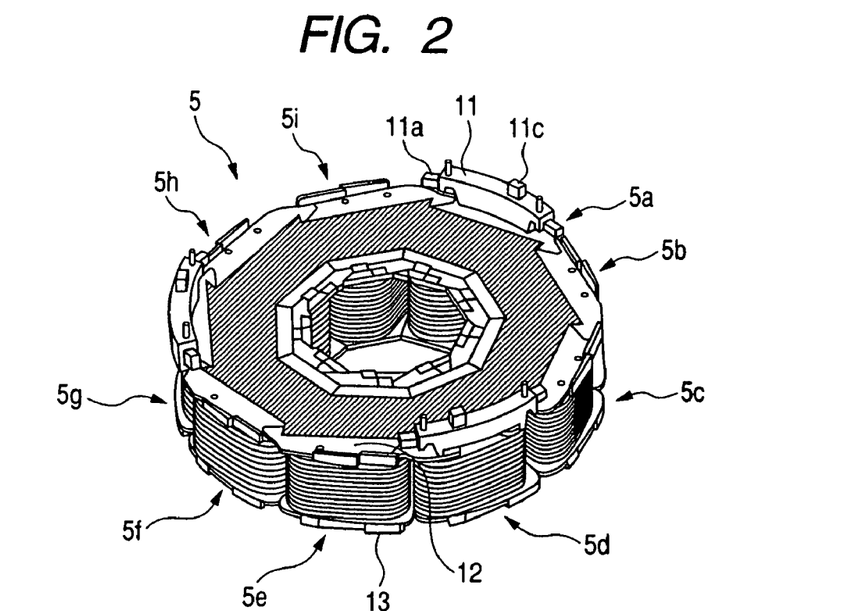
FIG. 2 is a perspective view showing a stator core.

As shown in FIG. 2, the stator core 5 is constructed by connecting nine ball members 5a to 5i in an annular shape. All of the respective ball members 5a to 5i have the same shape except for the wire connecting body 11 for electrically relaying and connecting winding wires fixed to ball members 5a, 5d and 5g.

As shown in FIG. 1, the ball member 5e has a tease (iron core) 51 formed by laminating plural metallic plates in a trapezoidal shape. An insulator 10 constructed by synthetic resin is integrally formed around the tease 51 except for its both side faces. The insulator 10 is entirely formed in a bobbin shape of an H-shape in section including flanges 12, 13 of an approximately fan type arranged as a pair of left and right along both side faces of the tease 51.

The wire connecting body 11 fixing a winding connecting terminal 11a of an L-type to both left and right ends on the surface of a flange 12 after (the outer circumferential side when the stator is formed) an arbitrary ball member, e.g., the ball member 5d if it is a U-phase is then mounted. A coil winding terminal of the ball member 5e, i.e., a winding ending terminal Ub of the U-phase is then entwined and soldered to one winding connecting terminal 11a projected in a horizontal direction. A winding starting terminal Ua of the U-phase is entwined and soldered to another winding connecting terminal 11a.

Thus, after a ball member unit of three phases is formed, as shown in FIG. 2, the ball member for the U-phase is arranged in an arc shape, and a ball member for a V-phase is arranged in an arc shape adjacently to this ball member for the U-phase, and a ball member for a W-phase is arranged in an arc shape adjacently to the ball member for the V-phase. Both neighbors of these respective ball members are respectively connected. Thus, the nine ball members are assembled in an annular shape.

Figure 3:
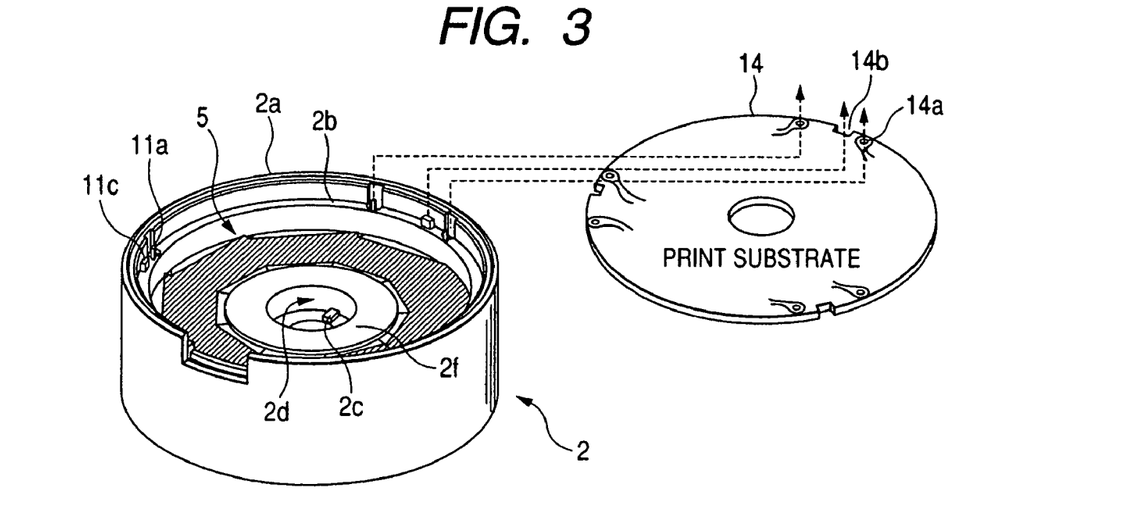
FIG. 3 is a perspective view showing a stator and a print substrate for driving.

As shown by the perspective view of FIG. 3, an outer circumferential portion of each ball member, an inner circumferential portion including the bearing hole 2d and the bearing hole 2e, and the wire connecting body 11 for a leader line are then solidified by synthetic resin by insert molding so that the stator 2 is made. At this time, a stopper 2c of a convex shape for regulating a sliding movement of the rotating axis direction is simultaneously arranged by the insert molding on a bottom face of the bearing hole 2d of the stator 2.

A step portion 2a fitting and attaching the bracket cover 15 thereto, and a step portion 2b fitting and attaching the vicinity of the outer circumference of the print substrate thereto are arranged in this stator 2. After the insert molding, the winding connecting terminal 11a and a substrate positioning boss 11c of the wire connecting body 11 are structurally exposed.

The winding connecting terminal 11a projected in a direction perpendicular to the wire connecting body 11 is inserted into a hole 14a of the print substrate 14 mounting a driving circuit for the electric motor, and is soldered to a land pattern of this print substrate 14. Further, the substrate positioning boss 11c of the wire connecting body 11 and a notch 14b of the print substrate 14 are simultaneously fitted. The print substrate 14 illustrated in FIG. 3 is mounted after each rotor is mounted.

The structure of the stator 2 and the bearing will next be explained by using the exploded perspective view of FIG. 4.

Figure 4:
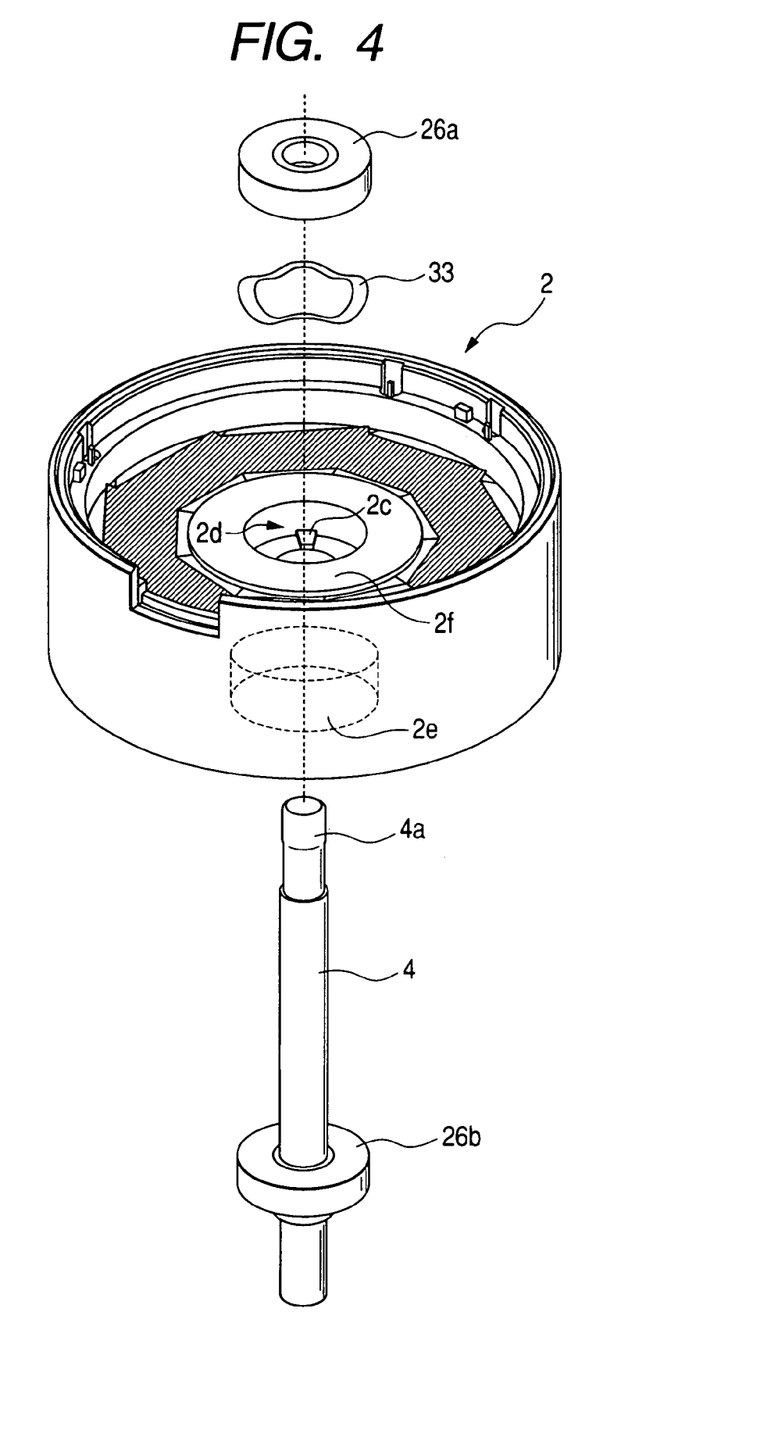
FIG. 4 is an exploded perspective view showing the stator, a radial ball bearing and a rotating shaft.

As shown in the perspective view of FIG. 4, the second bearing 26b is fixed to the rotating shaft 4 of the side opposed to a load attaching portion 4a connected to load. This rotating shaft 4 is inserted into each of the bearing hole 2e of the stator core 2, the bearing hole 2d, the leaf spring 33 of a ring shape (wave washer spring) and the first bearing 26a. The second bearing 26b is press-fitted into the bearing hole 2e, and the first bearing 26a is mounted to the bearing hole 2d. A slight gap is formed between the bearing hole 2d and an outer ring of the first bearing 26a. An inner ring of the first bearing 26a is then fixed to the rotating shaft 4.

As shown in FIG. 1, a stopper and a leaf spring of a ring shape are not arranged in the bearing hole 2e. An inner ring of the second bearing 26b attains a state always pressed toward a load direction (the left-hand side of FIG. 1) of the rotating shaft 4 by an influence of the leaf spring 33 of a ring shape. Further, even when the rotating shaft 4 is slid in the load direction, the size of each portion is prescribed such that the rotor 9 and the stator 2 do not come in contact.

The structure of the stopper 2c and the leaf spring 33 will next be explained by using the explanatory view of FIG. 6.

Figure 6A:
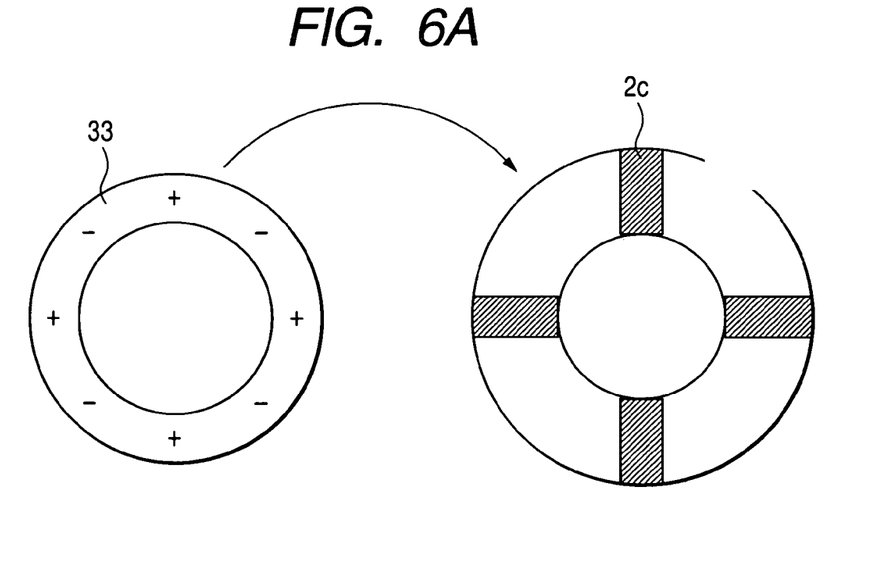
FIG. 6A is a plan view and FIG. 6B is a perspective view.

The right-hand side view of FIG. 6A is a plan view in which the bearing hole 2d of the stator 2 is seen from the axial direction. The stopper 2c of a rectangular shape formed integrally with the stator 2 is projected from a bottom face of the bearing hole 2d and is arranged on this bottom face by molding. Four stoppers 2c are equally arranged in the circumferential direction. The leaf spring 33 of a ring shape shown in the left-hand side view of FIG. 6A and having a wave type in section along the circular circumference is mounted to the bottom face of this bearing hole 2d so as to be covered.

Thus, the stopper is arranged on a face of the rotating axis direction of the stator for forming the bearing hole, and is set to a convex shape toward the leaf spring so that the stopper can be integrally formed by a mold as one portion of the stator, and the number of assembly works can be reduced.

On the other hand, the leaf spring 33 has four vertexes of a wave shape (illustrated by symbol −) toward the bottom face of the bearing hole 2d, and four vertexes of a wave shape (illustrated by symbol +) toward an opening of the bearing hole 2d. The vertexes of two kinds are alternately and equally arranged in the circumferential direction, and correspond to the positions of the stoppers 2c.

Figure 6B:
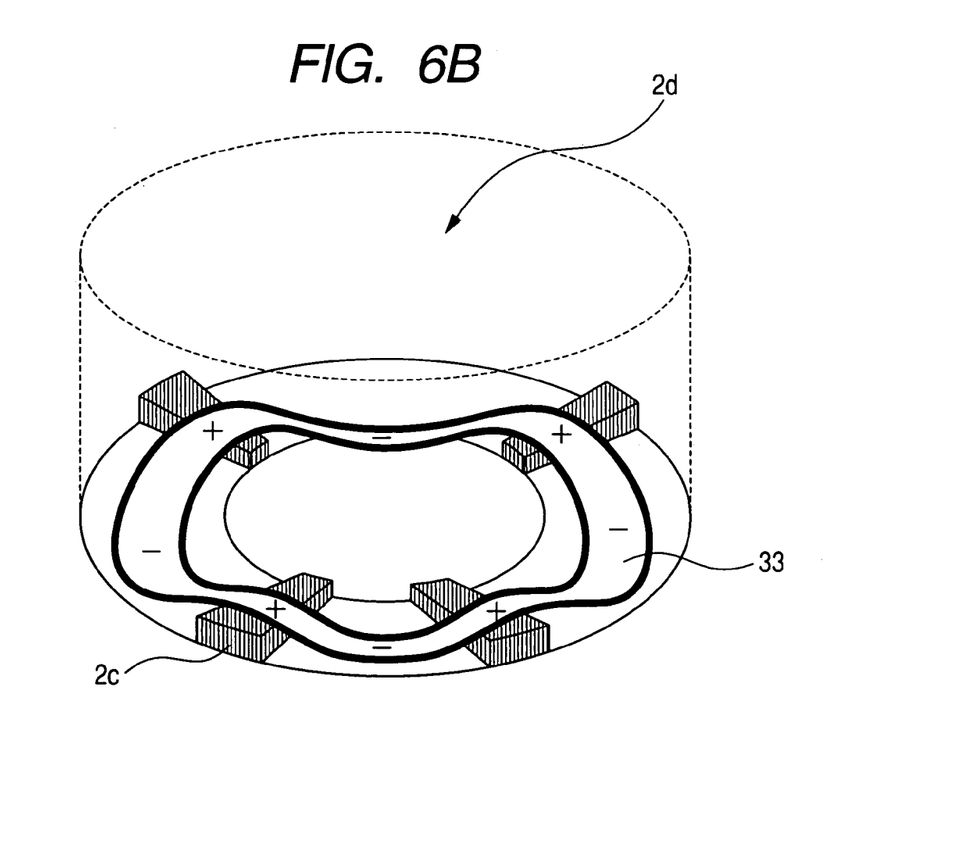

The perspective view of FIG. 6B shows the position relation of the stopper 2c and the leaf spring 33. The four vertexes of a wave type (illustrated by symbol +) of the leaf spring 33 are arranged so as to cross the four stoppers 2c. Accordingly, one side face of the unillustrated first bearing 26a abuts on the four vertexes of a wave type (illustrated by symbol +) of the leaf spring 33. The four vertexes of a wave type (illustrated by symbol −) of the leaf spring 33 abut on the bottom face of the bearing hole 2d. Thus, a structure for pre-pressurizing the first bearing 26a in the load direction of the rotating shaft 4 is set.

Figure 5:
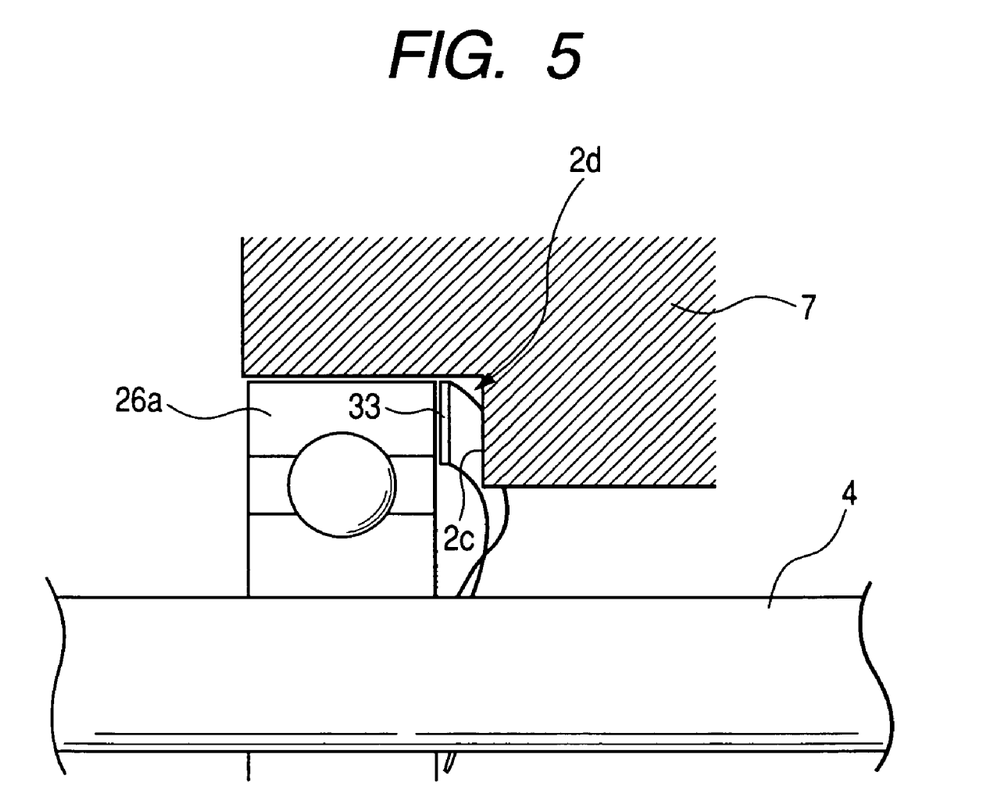
FIG. 5 is a cross-sectional view of a main portion showing the circumference of the radial ball bearing of the stator.

FIG. 5 is a cross-sectional view of a main portion showing the circumference of the radial ball bearing of the stator in the present invention, and is an example showing the stopper of a rectangular shape.

In FIG. 5, the leaf spring 33 of a ring shape is arranged in a space between the bottom face of the bearing hole 2d of the stator 2 constructed by the insert-molded synthetic resin 7 and the first bearing 26a. As mentioned above, a structure for-pre-pressurizing the outer ring of the first bearing 26a in the left-hand axial direction in FIG. 1 is set.

Further, the rotors 8, 9 and the rotating shaft 4 are set to a structure for arranging the stopper 2c for regulating a sliding movement of the right-hand rotating axis direction in FIG. 1 by the insert molding. This stopper 2c is formed as four projections of a rectangular shape arranged in the circumferential direction of the bottom face of the bearing hole 2d of the stator 2. Therefore, a space for arranging the leaf spring 33 of a ring shape exists between a tip of this stopper 2c and the bottom face of the bearing hole 2d.

Further, a predetermined space also exists between the tip of this stopper 2c and one side face of the first bearing 26a. The leaf spring 33 of a ring shape is elastically deformed, i.e., performs an operation as a spring within this space and the space between the tip of the above stopper 2c and the bottom face of the bearing hole 2d.

Accordingly, even when the rotating shaft 4 is greatly slid and one side face of the first bearing 26a presses the leaf spring 33 of a ring shape in a bottom face direction of the bearing hole 2d and attains a state abutting on the tip of the stopper 2c, the leaf spring 33 of a ring shape attains a state stopping at an intermediate stage of the elastic deformation within the above spaces. Thus, no leaf spring 33 of a ring shape is pushed and crushed. Therefore, the leaf spring 33 is set to a structure able to hold a spring property. Further, since the stopper 2c exists, a sliding movement of the rotating shaft 4, i.e., a sliding movement of the first bearing 26a is stopped. As a result, the rotor 8 and the stator 2 do not come in contact with each other. Thus, lock of the rotor rotation caused by this contact can be prevented. A spring, etc. may be also substituted for the pre-pressurizing member instead of the leaf spring of a ring shape.

Figure 7A:
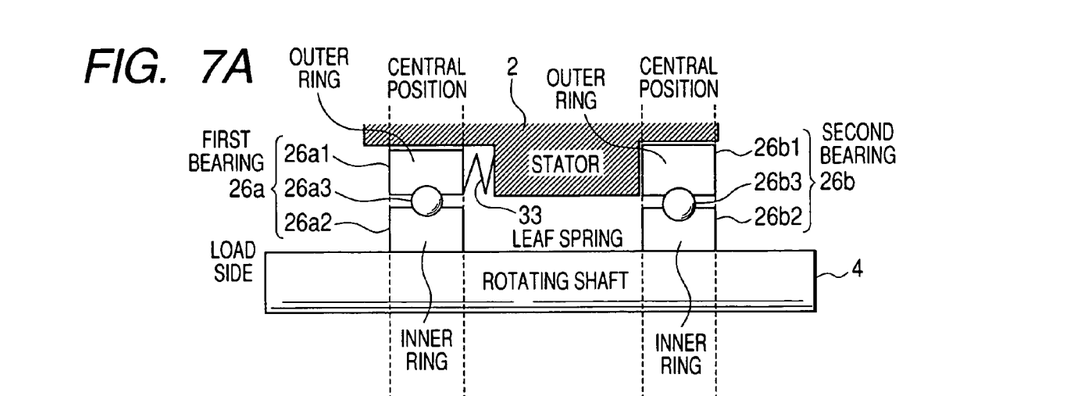
FIG. 7A shows an aligning state of inner rings and outer rings of two bearings.
Figure 7B:
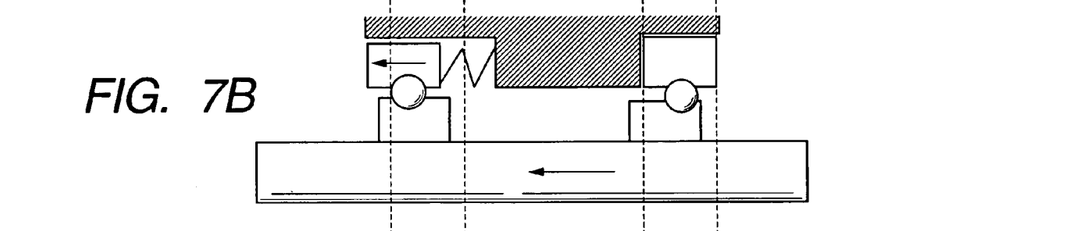
FIGS. 7B to 7D show three states able to be taken in the rotating shaft and the two bearings.
Figure 7C:
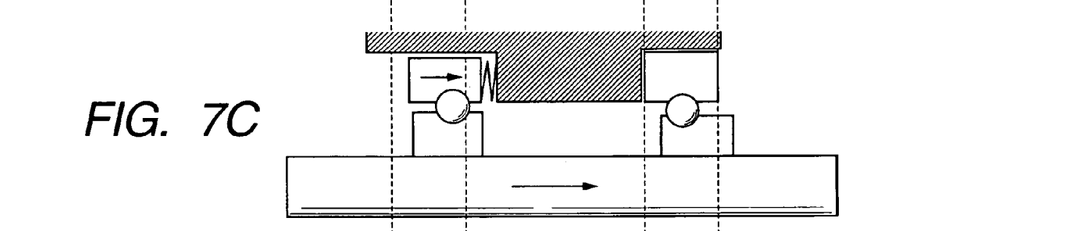
Figure 7D:
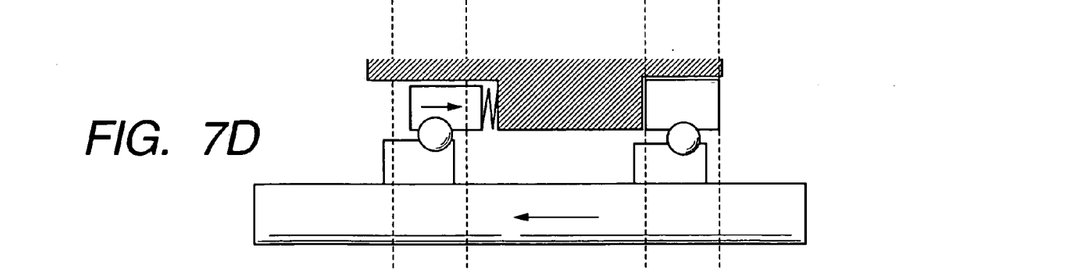

Movements of the rotating shaft 4 and the two bearings will next be explained by using the explanatory view of the section of a main portion of FIG. 7. FIG. 7A shows a state in which the inner rings and the outer rings of the two bearings are aligned. FIGS. 7B to 7D show three states able to be taken in the rotating shaft 4 and the two bearings. Arrows in each figure show shift directions of each bearing and the rotating shaft from a central position (a position for aligning the inner ring and the outer ring and shown by a dotted line) of each bearing.

The structure of each portion will be explained by using FIG. 7A. The first bearing 26a and the second bearing 26b for pivoting the rotating shaft 4 are arranged on both side faces of the vicinity of the inner circumference of the stator 2. Further, the first bearing 26a is constructed by an outer ring 26a1 and an inner ring 26a2 and plural first balls 26a3 arranged between these outer and inner rings.

Similarly, the second bearing 26b is constructed by an outer ring 26b1, an inner ring 26b2 and plural second balls 26b3 arranged between these outer and inner rings. The inner ring 26a2 and the inner ring 26b2 are fixed to the rotating shaft 4. Further, the outer ring 26b1 of the second bearing 26b is fixed by press-fitting into the stator 2. On the other hand, the outer ring 26a1 of the first bearing 26a is freely set with respect to the stator 2.

The outer ring 26a1 of the first bearing 26a is pre-pressurized in a load direction by the leaf spring 33 (pre-pressurizing section). Further, clearances respectively exist between the outer ring of each bearing and a ball, and this ball and the inner ring. Accordingly, the rotating shaft 4 is slid by an amount of these clearances in the axial direction.

FIG. 7B shows a state in which the outer ring 26a1 of the first bearing 26a is pre-pressurized in the load direction by the leaf spring 33, and the rotating shaft 4 is slid on the load side at its maximum by the amount of the above clearances. Accordingly, the clearance of the two bearings is removed, and the rotating shaft 4 is smoothly rotated. Therefore, it is a state able to reduce a vibration and noises.

FIG. 7C shows a state in which the rotating shaft 4 is slid on the load side at its maximum by the amount of the above clearances in a direction (the right-hand side of FIG. 7) opposed to the load by an external factor such as characteristics of the load, attraction and repulsion of magnetic force, etc. In this case, the clearance of the two bearings is also removed, and the rotating shaft 4 is smoothly rotated. Therefore, it is a state able to reduce a vibration and noises.

FIG. 7D shows a state in which the rotating shaft 4 is slid on the load side by a sudden external factor such as characteristics of the load, attraction and repulsion of magnetic force, etc. from the state of FIG. 7C. Therefore, it shows a state in which no sliding movement of the outer ring 26a1 of the first bearing 26a due to repulsive force of the leaf spring 33 catches up with the sliding movement of the rotating shaft 4 onto the load side. However, in this case, the clearance of the two bearings is also removed and the rotating shaft 4 is also smoothly rotated. Therefore, it is also a state able to reduce a vibration and noises.

However, when a sliding period of the axial direction of the rotating shaft 4 and a sliding period of the outer ring 26a1 of the first bearing 26a are conformed and a resonating state, i.e., the state of FIG. 7A is attained, as mentioned above, a ball 26a2 arranged between the outer ring 26a1 and the inner ring 26a2 of the first bearing 26a is rotated while violently behaving in the range of the above clearance. Therefore, a problem exists in that a vibration and noises are increased. This is a problem explained in the background art.

This embodiment is characterized in that the resonance due to the conformity of the sliding period of the axial direction of the above rotating shaft 4 and the sliding period of the outer ring 26a1 of the first bearing 26a is reduced by arranging a section for pre-pressurizing the rotating shaft 4 in one of the left and right rotating axis directions, i.e., by setting the state of FIG. 7B or 7C. Therefore, a magnetic pre-pressurizing section for pre-pressurizing the rotating shaft 4 in a predetermined direction is arranged by intentionally making a magnetic unbalance of two rotors. This magnetic pre-pressurizing section will next be explained as three embodiments by using FIG. 8.

Even when dispersion of the axial distance of two ball bearings is generated in a manufacturing process of the electric motor by jointly using the pre-pressurizing section using the leaf spring and the magnetic pre-pressurizing section, the distance of this distance can be easily corrected by the pre-pressurizing section.

FIG. 8 is an explanatory view for explaining the sectional structure of a main portion of the stator 2 and the rotors 8, 9. Here, a magnetic pre-pressurizing section for pre-pressurizing the inner ring in the axial direction by a difference of magnetic forces of the axial direction in one air gap and the other air gap by setting each of three parameters to a predetermined value is arranged. These three parameters are a magnetizing amount of the permanent magnet, thicknesses t1 and t2 of the permanent magnets, and air gap distances L1 and L2 of the stator 2 and each permanent magnet in each rotor. The air gap distance explained here prescribes an air gap distance of a face of the tease 51 of the stator 2 and each permanent magnet face.

The above magnetic pre-pressurizing section is realized by destroying each balance in one relation or more among these three parameters in each rotor and the stator.

Figure 8A:
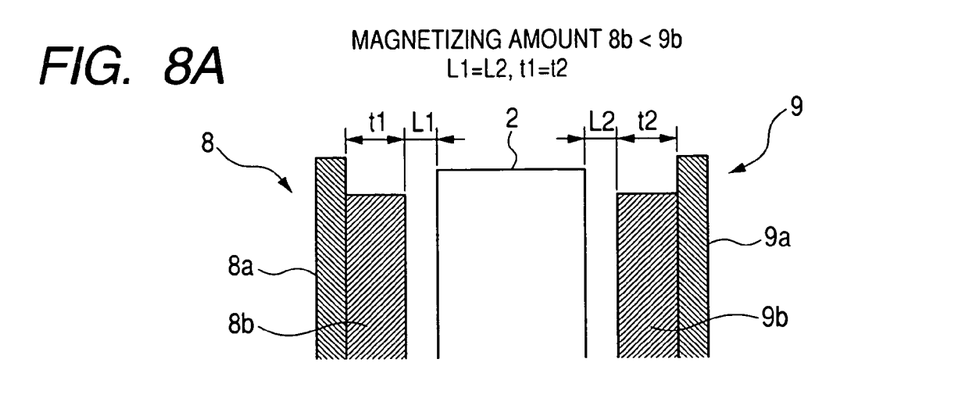
FIGS. 8A to 8C show the structures of magnetic pre-pressurizing section different from each other.

FIG. 8A shows the magnetic pre-pressurizing section used in this embodiment 1, and the magnetizing amount of the permanent magnet 8b is set to be smaller than that of the permanent magnet 9b. The thicknesses t1 and t2 of the respective permanent magnets are set to the same thickness, and the air gap distances L1 and L2 of the stator 2 are set to the same distance, Therefore, the rotors 8, 9 attain a state in which pre-pressure is applied in the leftward direction of FIG. 8. This magnetizing amount means synthetic magnetic force of one magnetized magnet even when e.g., magnetic force characteristics of a sine wave shape are provided as well as when magnetization is performed at uniform strength in a magnetizing process in the manufacturing process.

Thus, the sizes of structures and members are set to the same as the conventional case, and only the magnetizing amount of each permanent magnet is differently set. Accordingly, in a device kind already started in mass production, it is possible to cope with situations by only partially changing the manufacturing process.

Further, in the magnetic pre-pressurizing section, the materials of the respective permanent magnets may be also set to be different from each other instead of the difference of the magnetizing amount. For example, in the same structure as FIG. 8A, the same effect as the difference of the magnetizing amount is obtained by forming the permanent magnet 8b by a material in which the magnetic force of the permanent magnet 8b is weaker than that of the permanent magnet 9b. Further, since the permanent magnet itself is set to a different member, dispersion of pre-pressurizing force due to working dispersion in the manufacturing process can be prevented.

Figure 8B:
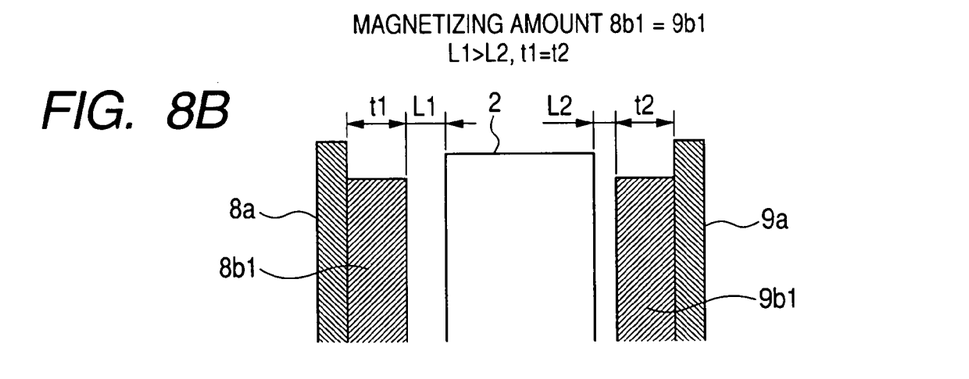

FIG. 8B shows another embodiment of the magnetic pre-pressurizing section. The magnetizing amount of a permanent magnet 8b1 is set to the same amount as a permanent magnet 9b1, and the thicknesses t1 and t2 of the respective permanent magnets are set to the same thickness. The air gap distance L1 is set to be longer than the air gap distance L2 as the distance between the stator 2 and the permanent magnet. Therefore, the rotors 8, 9 attain a state in which pre-pressure is applied in the leftward direction of FIG. 8.

Thus, the sizes of members are set to the same as the conventional case, and only a jig for determining a fixing position of the rotor is changed. Accordingly, even in a device kind already started in mass production, it is possible to cope with situations without changing the manufacturing process.

Figure 8C:
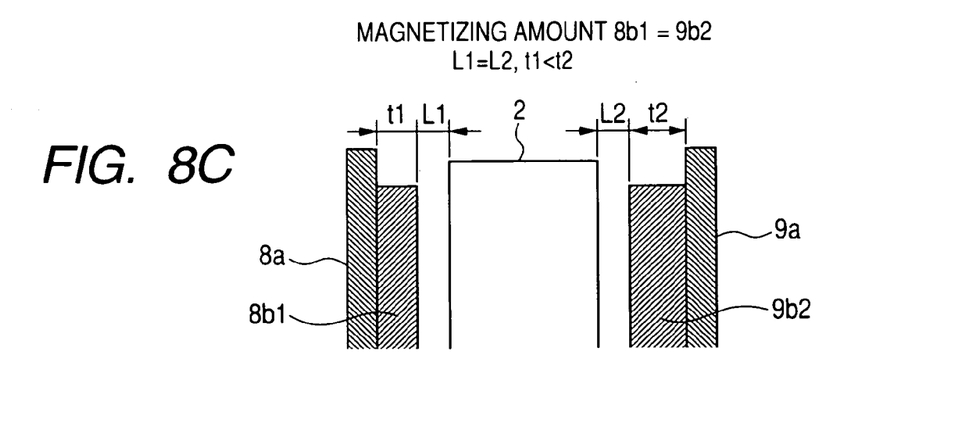

FIG. 8C shows another embodiment of the magnetic pre-pressurizing section. The magnetizing amount of the permanent magnet 8b1 is set to the same amount as the permanent magnet 9b2, and the air gap distances L1 and L2 as the distance of the stator 2 and the permanent magnet are set to the same distance. The thickness t1 of the permanent magnet 8b1 is set to be thicker than the thickness t2 of the permanent magnet 9b2. Therefore, the rotors 8, 9 attain a state in which pre-pressure is applied in the leftward direction of FIG. 8. Here, the thickness of the permanent magnet means a case in which an area opposed to the tease 51 is constant. Accordingly, if no area opposed to the tease 51 is constant, the thickness of the permanent magnet means volume of the permanent magnet.

Thus, since the permanent magnet itself is set to a different member, dispersion of pre-pressure due to working dispersion in the manufacturing process can be prevented.

Further, the three magnetic pre-pressurizing section have been explained as mentioned above, but plural magnetic pre-pressurizing section may be also combined and used instead of usage of only one magnetic pre-pressurizing section.

FIG. 9 is an explanatory view for explaining the sectional structure of a main portion of the stator 2 and the rotors 8, 9. In this figure, the shape of the tease (iron core) 51 is also described. Here, in a state in which the above three parameters are balanced, the magnetic pre-pressurizing section is arranged by destroying the balance of further other two parameters. These other two parameters are the shape of the tease 51, and strength of magnetic force at the air gap distances L1 and L2. The magnetic pre-pressurizing section in the leftward direction in FIG. 9 is realized by destroying each balance in one relation or more among these two parameters in each rotor and the stator. The magnetic pre-pressurizing section may be also constructed by combining five parameters also including these two parameters in addition to the above three parameters.

Figure 9A:
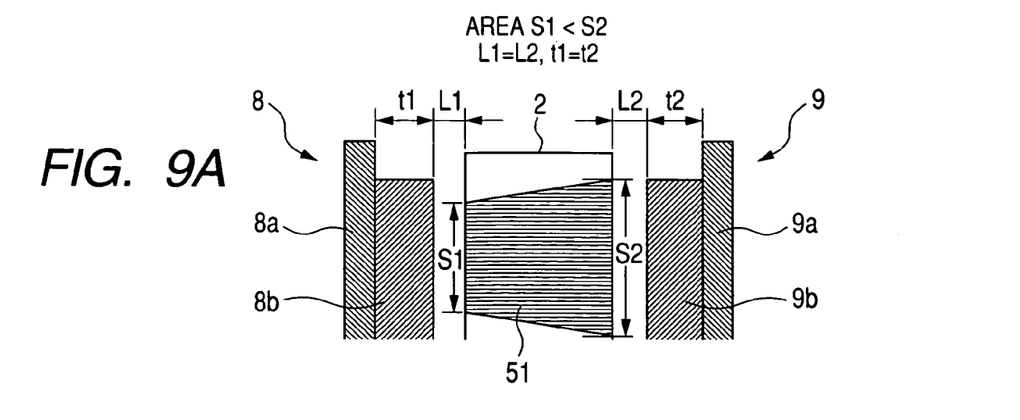
FIGS. 9A to 9C show the structures of magnetic pre-pressurizing section different from each other.

In FIG. 9A, the areas of end faces of the tease 51 corresponding to both end faces of the stator 2, i.e., the areas of air gap faces shown by the arrows of S1 and S2 are formed so as to be different in S1 and S2. The magnetic pre-pressurizing section in the leftward direction in FIG. 9 is realized by setting the area of S1 to be smaller than the area of S2. Thus, it is sufficient to change only the iron core of the stator without changing the structure of the rotor and the permanent magnet. Therefore, a design period of the electric motor can be shortened.

Figure 9B:
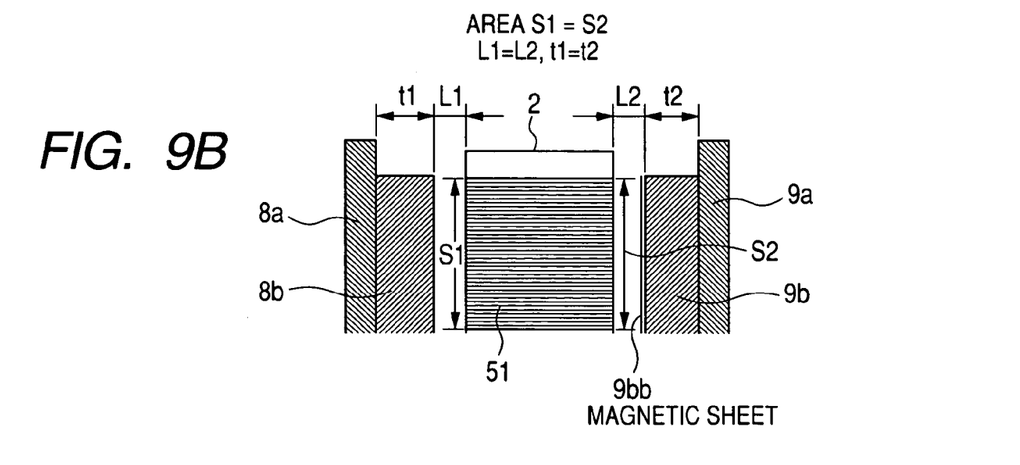

FIG. 9B shows a structure for sticking a magnetic sheet 9bb onto a face opposed to the air gap of the permanent magnet 9b. Namely, the magnetic pre-pressurizing section in the leftward direction in FIG. 9 is realized by differently setting magnetic permeability at the air gap distance L1 and magnetic permeability at the air gap distance L2 in accordance with the magnetic sheet 9bb. Thus, in the manufacturing process, pre-pressure can be easily adjusted by changing the existence of the sheet and its material. Therefore, the electric motors of many kinds different in pre-pressure can be easily manufactured.

Similar effects can be also obtained when the magnetic sheet 9bb is not stuck to the permanent magnet 9b, but is stuck to an end face of the tease 51 opposed to the permanent magnet 9b.

Figure 9C:
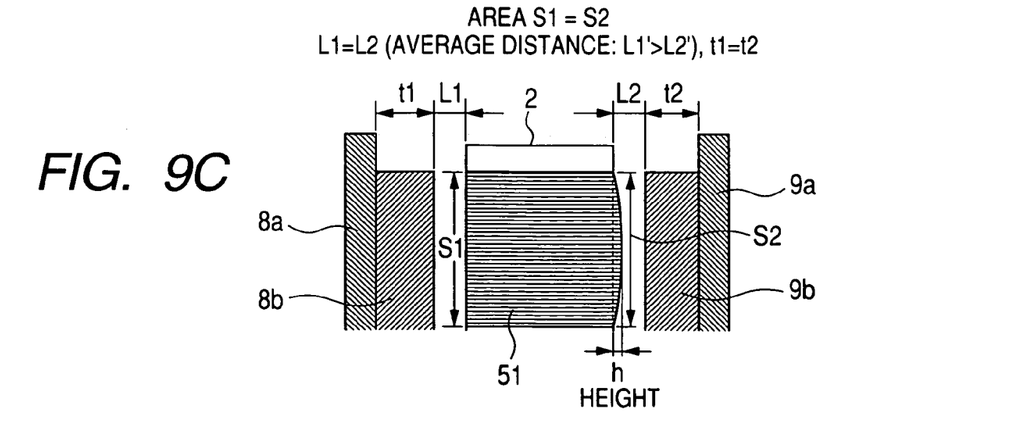

FIG. 9C shows a structure in which the end face of the tease 51 opposed to the permanent magnet 9b is projected in an arc shape by height h in the direction of the permanent magnet 9b. Therefore, the air gap distance L1 and the air gap distance L2 are the same, but an average distance L2' with respect to the air gap distance L2 is smaller than an average distance L1' with respect to the air gap distance L1. Therefore, the magnetic pre-pressurizing section in the leftward direction in FIG. 9 is realized. Thus, it is sufficient to change only the iron core of the stator without changing the structure of the rotor and the permanent magnet, and a design period of the electric motor can be shortened.

Further, similar effects can be also obtained as a structure projected to a face opposed to the air gap of each permanent magnet in an arc shape although this structure is not shown in the drawings.

In the above five examples, the rotor (also including the rotating shaft) is pre-pressurized on the load side (the leftward direction of FIG. 8 or 9) by using the magnetic pre-pressurizing section. However, the rotor (also including the rotating shaft) can be also pre-pressurized on the side (the rightward direction of FIG. 8 or 9) opposed to load by reversely setting large and small relation of each parameter. It is determined by considering pressing of a thrust direction due to the load whether the rotor is pre-pressurized in which direction.

The pre-pressurizing section (the leaf spring 33 of a ring shape) explained in the background art in this embodiment and the magnetic pre-pressurizing section as features of this embodiment are jointly used. However, if the distance of the direction of the rotating shaft 4 between the first bearing 26a and the second bearing 26b can be accurately held, similar effects explained in FIG. 8 or 9 can be also obtained even when there is no pre-pressurizing section (the leaf spring 33 of a ring shape).

Embodiment 2

Figure 10:
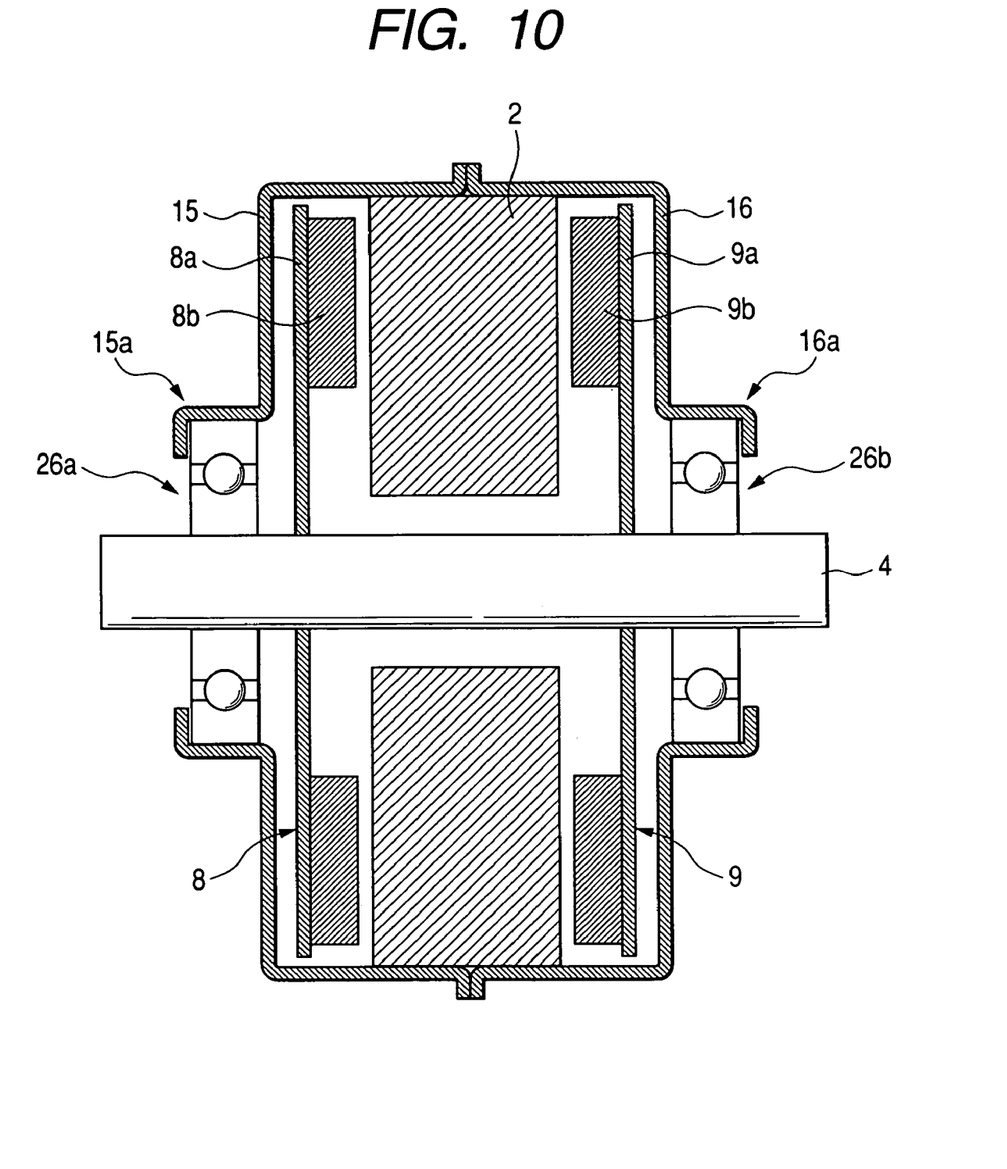
FIG. 10 is a cross-sectional view of an axial air gap type electric motor in accordance with embodiment mode 2 using the present invention.

Another embodiment will next be explained by using FIG. 10. FIG. 10 is a cross-sectional view of an axial air gap type electric motor using the present invention. This axial air gap type electric motor has the same structure as the structure of embodiment 1. Therefore, parts having the same functions are designated by the same numbers, and their detailed explanations are omitted.

A large difference between this embodiment and embodiment 1 is arranging places of the first bearing 26a and the second bearing 26b. In embodiment 1, the first bearing 26a and the second bearing 26b are arranged within the stator. However, in this embodiment, the first bearing 26a and the second bearing 26b are respectively arranged in respective mounting portions 15a, 16b of two brackets 15, 16.

The brackets 15, 16 are press-fitted into the stator 2 from its side face. Therefore, the two brackets and the stator 2 attain a fixed state. Further, the mounting portions 15a, 16b of an L-shape in section are arranged in the respective brackets 15, 16 by press working, and each bearing is here mounted.

As explained in embodiment 1, the permanent magnets 8b, 9b arranged in the rotors 8, 9 are formed such that the magnetizing amount is different. The magnetic pre-pressurizing section is formed by this difference in magnetic force. Further, the distance of the direction of the rotating shaft 4 between the first bearing 26a and the second bearing 26b is accurately prescribed. Therefore, the outer rings of the respective bearings are press-fitted and fixed to the respective mounting portions 15a, 16a. The magnetic pre-pressurizing section is not limited to this construction, but the above method can be similarly used.

In this embodiment, no pre-pressurizing section for pre-pressurizing the outer ring of the bearing is arranged, but may be also arranged in accordance with necessity. In this case, it is preferable that the inside diameter of one mounting portion is set to be slightly greater than the outside diameter of the bearing, and the pre-pressurizing section of the outer ring explained in embodiment 1 is arranged. In this case, a pre-pressurizing direction becomes a direction toward a side face of the stator.

The present invention is not limited to the electric motor of three phases and nine slots explained above, but can be widely applied to three phases and twelve slots, an axial air gap type electric motor having a radial ball bearing within the stator of a ring shape, etc.

Further, the present invention is not limited to the shapes of the rotor and the stator explained in this embodiment. For example, there are effects of the present invention even when the projecting portions 2f, 2g, the concave portions 8d, 9d and the stopper 2c are not arranged.

FIGURE LEGEND

[FIG. 1]
A1 LOAD SIDE
[FIG. 3]
A1 PRINT SUBSTRATE
[FIG. 7A]
A1 CENTRAL POSITION
A2 OUTER RING
A3 INNER RING
2 STATOR
26a FIRST BEARING
33 LEAF SPRING
26b SECOND BEARING
4 ROTATING SHAFT
[FIG. 7D]
A4 IN FIGS. 7A TO 7D, ARROWS SHOW SHIFT DIRECTIONS FROM THE CENTRAL POSITION.
[FIG. 8A]
A1 MAGNETIZING AMOUNT
[FIG. 9A]
A1 AREA
[FIG. 9B]
9bb MAGNETIC SHEET
[FIG. 9C]
A2 AVERAGE DISTANCE
A3 HEIGHT
[FIG. 12]
52, 53 (REAR FACE)

What is claimed is:

1. An axial air gap type electric motor comprising:
a stator having tease portions on first and second side faces;
first and second rotors, each rotor having a permanent magnet oppositely arranged with a predetermined air gap between the permanent magnet and the respective tease portion;
a rotating shaft arranged on a rotating axis of the first and second rotors and fixing the first and second rotors thereto;
first and second ball bearings each having an inner ring fixed to the rotating shaft by pivoting the rotating shaft;
an outer ring of the first ball bearing fixed to the stator;
a pre-pressurizing section for pre-pressurizing an outer ring of the second ball bearing in a first axial direction, the pre-pressurizing section comprising a ring-shaped leaf spring located between the outer ring of the second ball bearing and the stator, the leaf spring having a vertex contacting the outer ring of the second ball bearing and a vertex contacting the stator;
a stopper located between the vertex contacting the outer ring of the second ball bearing and the stator;
a magnetic pre-pressurizing section for pre-pressurizing the inner rings in a second axial direction by a difference of magnetic force of the axial direction in one of the air gaps and the other of the air gaps, wherein the first axial direction and the second axial direction are the same, and
a plurality of stoppers located between the ring-shaped leaf spring and the stator, wherein the stoppers are arranged in diametrically opposed pairs with respect to the rotating axis.

2. The axial air gap type electric motor according to claim 1, wherein the magnetic pre-pressurizing section is constructed by a difference of a magnetizing amount of the permanent magnet arranged in each of the rotors.

3. The axial air gap type electric motor according to claim 1, wherein the magnetic pre-pressurizing section is constructed by a difference of a distance of the one air gap and a distance of the other air gap.

4. The axial air gap type electric motor according to claim 1, wherein the magnetic pre-pressurizing section is constructed by a difference of volume of the permanent magnet arranged in each of the rotors.

5. The axial air gap type electric motor according to claim 1, wherein the magnetic pre-pressurizing section is constructed by a difference of magnetic force due to a difference of a material of the permanent magnet arranged in each of the rotors.

6. The axial air gap type electric motor according to claim 1, wherein the magnetic pre-pressurizing section is constructed by a difference of an opposite area of the tease portion opposed to the one air gap, and an opposite area of the tease portion opposed to the other air gap.

7. The axial air gap type electric motor according to claim 1, wherein the magnetic pre-pressurizing section is constructed by a difference of magnetic permeability in the one air gap and magnetic permeability in the other air gap.

8. The axial air gap type electric motor according to claim 1, wherein the magnetic pre-pressurizing section is constructed by a difference of an average distance of the one air gap and an average distance of the other air gap.

9. An axial air gap type electric motor comprising:
a stator having tease portions on both side faces;
a rotor having permanent magnets respectively oppositely arranged with predetermined air gaps in the tease portions;
a rotating shaft arranged on a rotating axis of the rotor and fixing the two rotors thereto;
two ball bearings having an inner ring fixed to the rotating shaft by pivoting the rotating shaft; and
two brackets forming mounting portions respectively mounting the ball bearings thereto;
an outer ring of the one ball bearing fixed to the mounting portion;
a pre-pressurizing section for pre-pressurizing an outer ring of the other ball bearing in an axial direction, the pre-pressurizing section comprising a ring-shaped leaf spring;
a magnetic pre-pressurizing section for pre-pressurizing the inner ring in the axial direction by a difference of magnetic force of the axial direction in one of the air gaps and the other of the air gaps; and
a plurality of stoppers located between the ring-shaped leaf spring and the stator, wherein the stoppers are arranged in diametrically opposed pairs with respect to the rotating axis.

10. The axial air gap type electric motor according to claim 9, wherein the magnetic pre-pressurizing section is constructed by a difference of a magnetizing amount of the permanent magnet arranged in each of the rotors.

11. The axial air gap type electric motor according to claim 9, wherein the magnetic pre-pressurizing section is constructed by a difference of a distance of the one air gap and a distance of the other air gap.

12. The axial air gap type electric motor according to claim 9, wherein the magnetic pre-pressurizing section is constructed by a difference of volume of the permanent magnet arranged in each of the rotors.

13. The axial air gap type electric motor according to claim 9, wherein the magnetic pre-pressurizing section is constructed by a difference of magnetic force due to a difference of a material of the permanent magnet arranged in each of the rotors.

14. The axial air gap type electric motor according to claim 9, wherein the magnetic pre-pressurizing section is constructed by a difference of an opposite area of the tease portion opposed to the one air gap, and an opposite area of the tease portion opposed to the other air gap.

15. The axial air gap type electric motor according to claim 9, wherein the magnetic pre-pressurizing section is constructed by a difference of magnetic permeability in the one air gap and magnetic permeability in the other air gap.

16. The axial air gap type electric motor according to claim 9, wherein the magnetic pre-pressurizing section is constructed by a difference of an average distance of the one air gap and an average distance of the other air gap.

17. An axial air gap type electric motor comprising:
a stator having tease portions on first and second side faces;
first and second rotors, each rotor having a permanent magnet oppositely arranged with a predetermined air gap between the permanent magnet and the respective tease portion;
a rotating shaft arranged on a rotating axis of the first and second rotors and fixing the first and second rotors thereto;
first and second ball bearings each having an inner ring fixed to the rotating shaft by pivoting the rotating shaft;
an outer ring of the first ball bearing fixed to the stator;
a pre-pressurizing section for pre-pressurizing an outer ring of the second ball bearing in a first axial direction, the pre-pressurizing section comprising a ring-shaped leaf spring;
a stopper located between the second ball bearing and the stator;
a magnetic pre-pressurizing section for pre-pressurizing the inner rings in a second axial direction by a difference of magnetic force of the axial direction in one of the air gaps and the other of the air gaps, wherein the first axial direction and the second axial direction are the same; and
a plurality of stoppers located between the ring-shaped leaf spring and the stator, wherein the stoppers are arranged in diametrically opposed pairs with respect to the rotating axis.

18. The axial air gap type electric motor according to claim 17, wherein the magnetic pre-pressurizing section is constructed by a difference of a distance of the one air gap and a distance of the other air gap.

* * * * *